Figure 1:
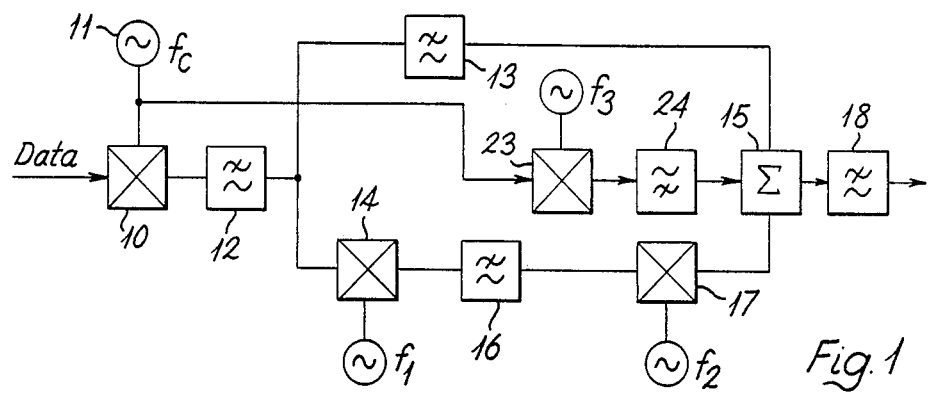

United States Patent [19]

McGeehan et al.

[11] Patent Number: 4,802,191
[45] Date of Patent: Jan. 31, 1989

[54] DATA TRANSMISSION USING A TRANSPARENT TONE-IN BAND SYSTEM

[75] Inventors: Joseph P. McGeehan, Corsham; Andrew Bateman, Bath, both of England

[73] Assignee: National Research Development Corporation, London, England

[21] Appl. No.: 19,129

[22] Filed: Feb. 26, 1987

[30] Foreign Application Priority Data

Feb. 28, 1986 [GB] United Kingdom ............... 8604981

[51] Int. Cl.⁴ ............................................. H04B 1/68
[52] U.S. Cl. ....................................... 375/43; 375/61; 375/77; 375/97; 455/46; 455/71
[58] Field of Search ............... 455/46, 47, 59, 61, 455/68, 71, 109, 207, 257; 375/43, 54, 61, 77, 97; 380/31, 33, 34, 38, 39; 370/110.1, 110.4

[56] References Cited

U.S. PATENT DOCUMENTS

| | | | |
|---|---|---|---|
| 3,271,681 | 9/1966 | McNair | 455/47 |
| 3,271,682 | 9/1966 | Bucher, Jr. | 455/47 |
| 3,349,181 | 10/1967 | Ito | 375/54 |
| 3,492,580 | 1/1970 | Berman | 455/47 |
| 3,969,675 | 7/1976 | Gosling | 455/71 |
| 4,675,880 | 6/1987 | Davarian | 375/54 |

*Primary Examiner*—Benedict V. Safourek
*Attorney, Agent, or Firm*—Cushman, Darby & Cushman

[57] ABSTRACT

In previous transparent tone-in band systems the notch has been removed from the frequency spectrum before a carrier signal carrying data has been demodulated. The present specification describes an arrangement in which data is recovered by first and second mixers from a signal having a spectrum containing a notch. Phase and frequency locking is obtained: either by using a third mixer fed from the inputs to the first and second mixers to provide, indirectly, one signal for a fourth mixer which also receives the carrier signals and provides demodulating signals for the first and second mixers; or by a correction system coupled to the outputs of the first and second mixers for correcting demodulating signals supplied to these mixers.

15 Claims, 5 Drawing Sheets

DATA TRANSMISSION USING A TRANSPARENT TONE-IN BAND SYSTEM

The present invention relates to apparatus and methods for demodulating signals, particularly data signals, transmitted using a transparent tone-in band (TTIB) system. British Patent Application No. 2161661A introduces U.S. Pat. No. 4,691,375 TTIB systems and various embodiments are described.

Where data signals are to be transmitted the data signals are used to modulate a carrier signal before the "notch" in the frequency spectrum is generated. The carrier signal may then be positioned in the notch during transmission and retrieved at the receiver to allow demodulation after the original spectrum (without the notch) has been restored.

According to a first aspect of the present invention there is provided a receiver for a communication system which employs a transmitter comprising:
 modulation means for modulating a carrier signal with an information signal,
 frequency selection and translation means for dividing a frequency band containing the modulation signal into upper and lower portions and for carrying out frequency translation, the output signal of the frequency selection and translation means having at least one said portion which is translated in frequency to provide a notch between the lower and upper portions, and
 means for transmitting the upper and lower portions and the said carrier signal,
 the receiver comprising
 means for demodulating at least one of the upper and lower portions using a demodulation signal,
 correcting means for deriving a correcting signal dependent on any difference in frequency and phase in the lower and upper portions on reception but as referred to the original spectrum of the information signal, and
 generating means for generating the demodulation signal from the said carrier signal, the generating means being coupled to receive the correcting signal and employ it in generating the demodulation signal.

In the transmitter, the modulation means may comprise a mixer receiving the information signal and the carrier signal but as an alternative the modulation means may comprise a modem employing, for example, binary phase-shift keying (BPSK) or quadrature phase-shift keying (QPSK).

Where the upper and lower portions correspond to the upper and lower sidebands of the output signal of the modulation means and a suitable simple modulation technique is used, for example BPSK, then it may sometimes only be necessary to demodulate only the upper or lower portion at the receiver, since each sideband theoretically contains all the information in the information signal. However since the processes used for forming the upper and lower portions are not perfect, some of the information will usually be lost unless both portions are demodulated. Preferably therefore the demodulation means is constructed to demodulate the upper and lower portions using the said demodulation signal and another demodulation signal, respectively. These signals are hereinafter referred to as the first and second demodulation signals.

The main advantage of the present invention is the direct demodulation of at least one of the upper and lower portions without previously restoring the spectrum to its original condition in the receiver.

Preferably the carrier signal is inserted, after frequency changing if required, into the notch in the transmitter and the generating means extracts the carrier signal from the signal received.

The correcting means may be coupled to receive, as input signals, at least parts of the upper and lower portions. Alternatively the correcting means may be coupled to receive, as input signals, demodulated output signals from the demodulation means, these output signals being dependent on any difference in frequency and phase in the upper and lower portions. Thus the correction applied in deriving the first and second demodulation signals may be "feed forward" or "feedback".

Where the feed forward alternative is employed, the upper and lower portions must contain at least one signal present at a significant level in both portions and the correcting means may include first mixer means coupled to receive at least parts of the first and second portions containing the said one signal and deriving as its output signal a signal having a frequency which is equal to the notch width. This output signal may then be coupled to means for dividing frequency by two to provide the output signal of the correcting means. The generating means may then employ a second mixer means which receives the carrier signal and the output signal from the correcting means and provides two output signals corresponding to upper and lower sidebands which are then used as the first and second demodulation signals and applied to third and fourth mixer means which demodulate the upper and lower portions, respectively.

Where the feedback alternative is used, the correcting means may comprise first mixer means which controls a locally generated reference signal and the generating means may comprise a second mixer which receives the carrier signal and the locally generated reference signal, and generates the first and second demodulating signals as upper and lower sidebands. The demodulation means may comprise third and fourth mixer means and the first mixer means may be coupled to receive the output signals of the third and fourth mixer means as input signals.

According to a second aspect of the present invention there is provided a receiver method for processing signals received in a communication system which employs a transmission method comprising modulating an information signal with a carrier signal, dividing the frequency spectrum containing the modulated signal into lower and upper portions with a frequency notch between the lower and upper portions, and transmitting the upper and lower portions and the carrier signal,
 the receiver method comprising demodulating the upper and lower portions using first and second demodulation signals respectively,
 deriving a correcting signal dependent on any difference in frequency and phase in the lower and upper portions on reception but as referred to the original spectrum of the information signal, and
 generating the first and second demodulation signals from the carrier signal and employing the correcting signal in generating at least one of the first and second demodulation signals.

According to a third aspect of the present invention there is provided a communication system including a transmitter and a receiver, the transmitter comprising modulation means for modulating a carrier signal with an information signal, frequency selection and filtering means for dividing the frequency spectrum containing the modulated carrier signal into upper and lower portions and for carrying out frequency translation, the output signal of the frequency selection and translation means having at least one said portion which is translated in frequency to provide a notch between the lower and upper portions, and means for transmitting the upper and lower portions and the carrier signal, and the receiver comprising means for demodulating the upper and lower portions using first and second demodulation signals, respectively, means for deriving a correcting signal dependent on any difference in frequency and phase in the lower and upper portions on reception but as referred to the original spectrum of the information signal, and generating means for generating the first and second demodulation signals from the said carrier signal, the generating means being coupled to receive the correcting signal and to employ the correcting signal in generating at least one of the first and second demodulation signals.

The means of modulating a carrier signal may comprise a mixer receiving the carrier and the information signal, or it may comprise a modem employing BPSK or QPSK.

According to a fourth aspect of the present invention there is provided a receiver for a TTIB system carrying a modulated information signal, comprising means for demodulating at least either of the portions above and below the notch in the frequency spectrum without first removing the notch from the spectrum.

The invention also includes a method equivalent to the fourth aspect of the invention.

The above mentioned means and methods steps may be implemented by operations, or groups of operations, programmed into an integrated circuit containing a microprocessor. For example a digital signal processor integrated circuit can be programmed in this way to form the various demodulators, mixer means and filters required.

Certain embodiments of the invention will now be described by way of example with reference to the accompanying drawings, in which:-

Figure 2A:
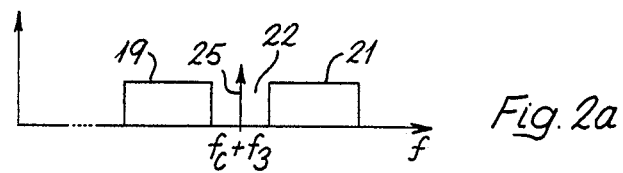
Figure 2B:
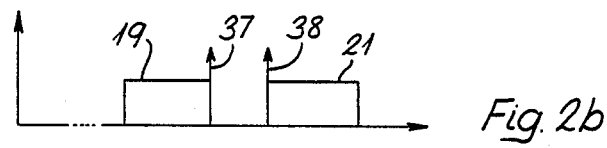
Figure 3:
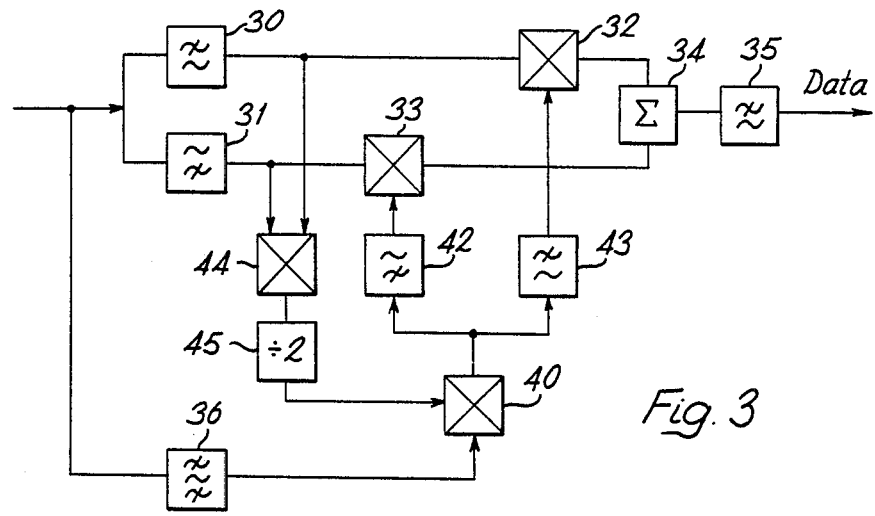
Figure 4:
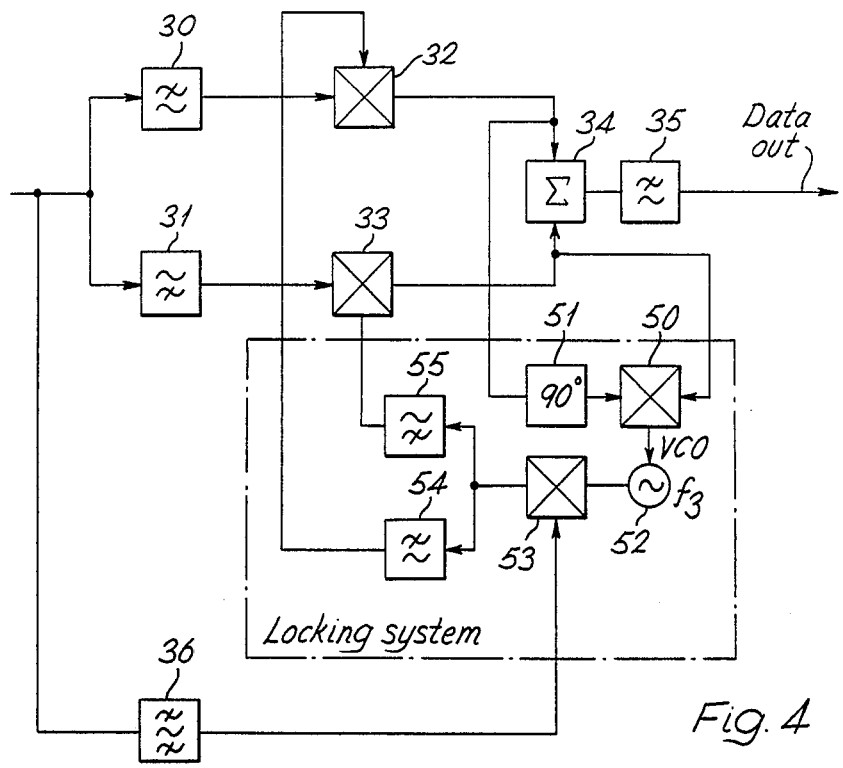
Figure 5:
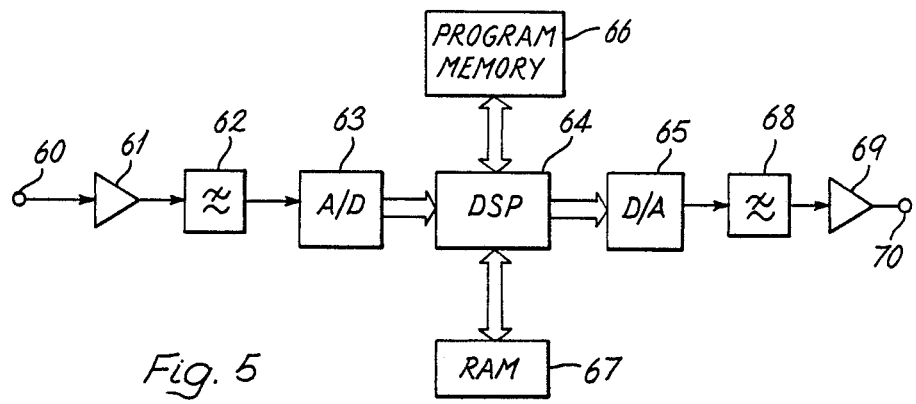
Figure 6:
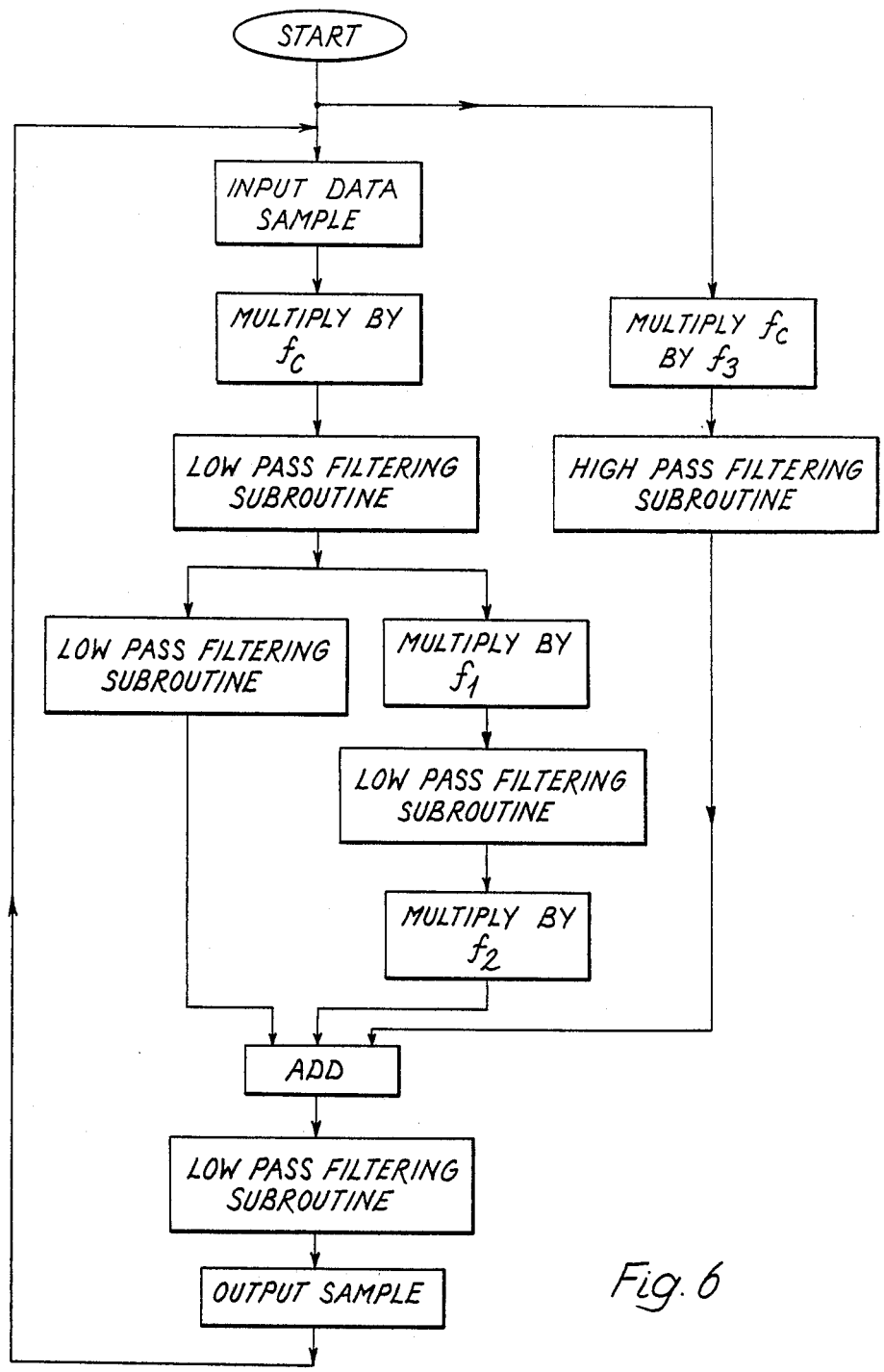
Figure 7:
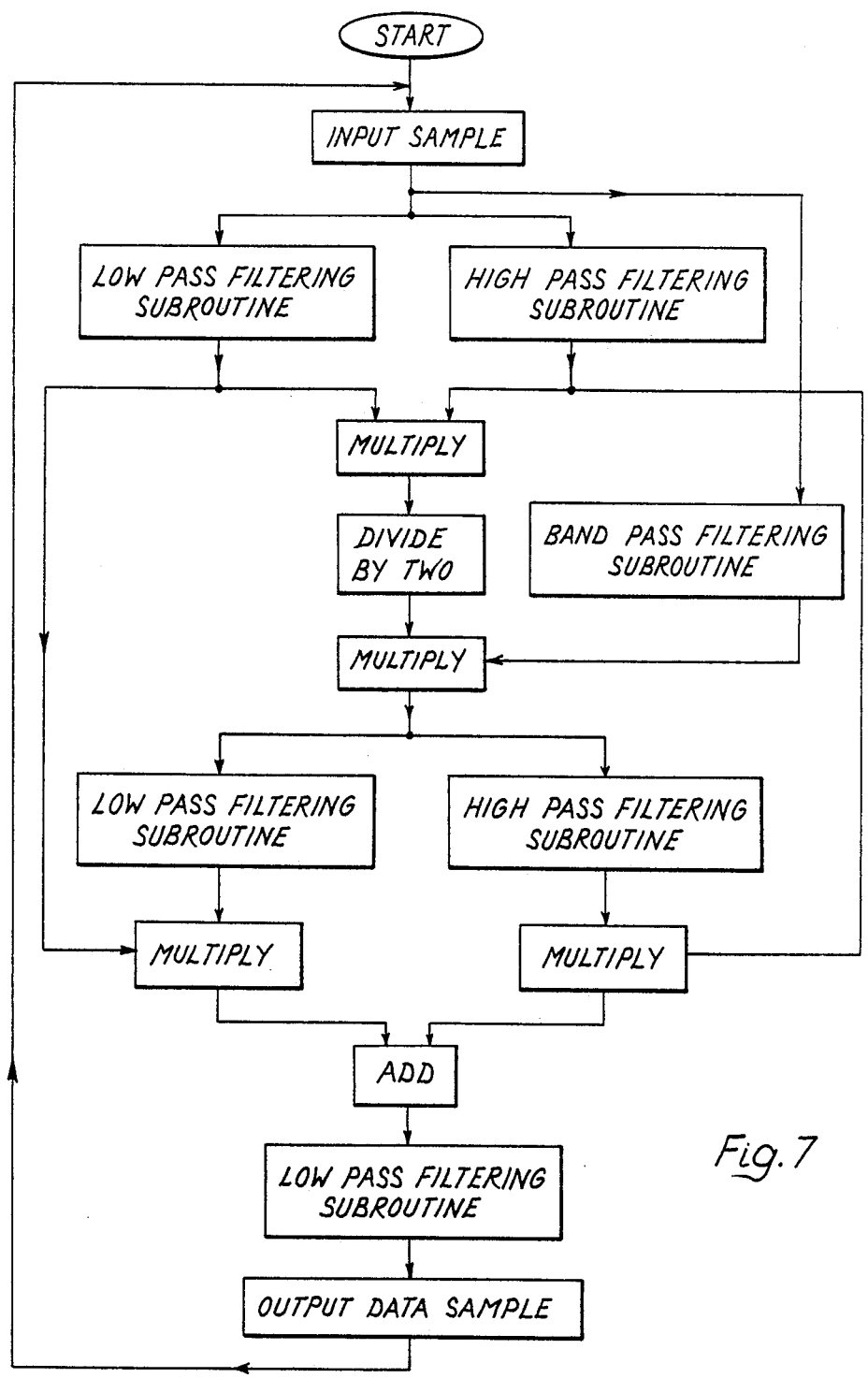
Figure 8:
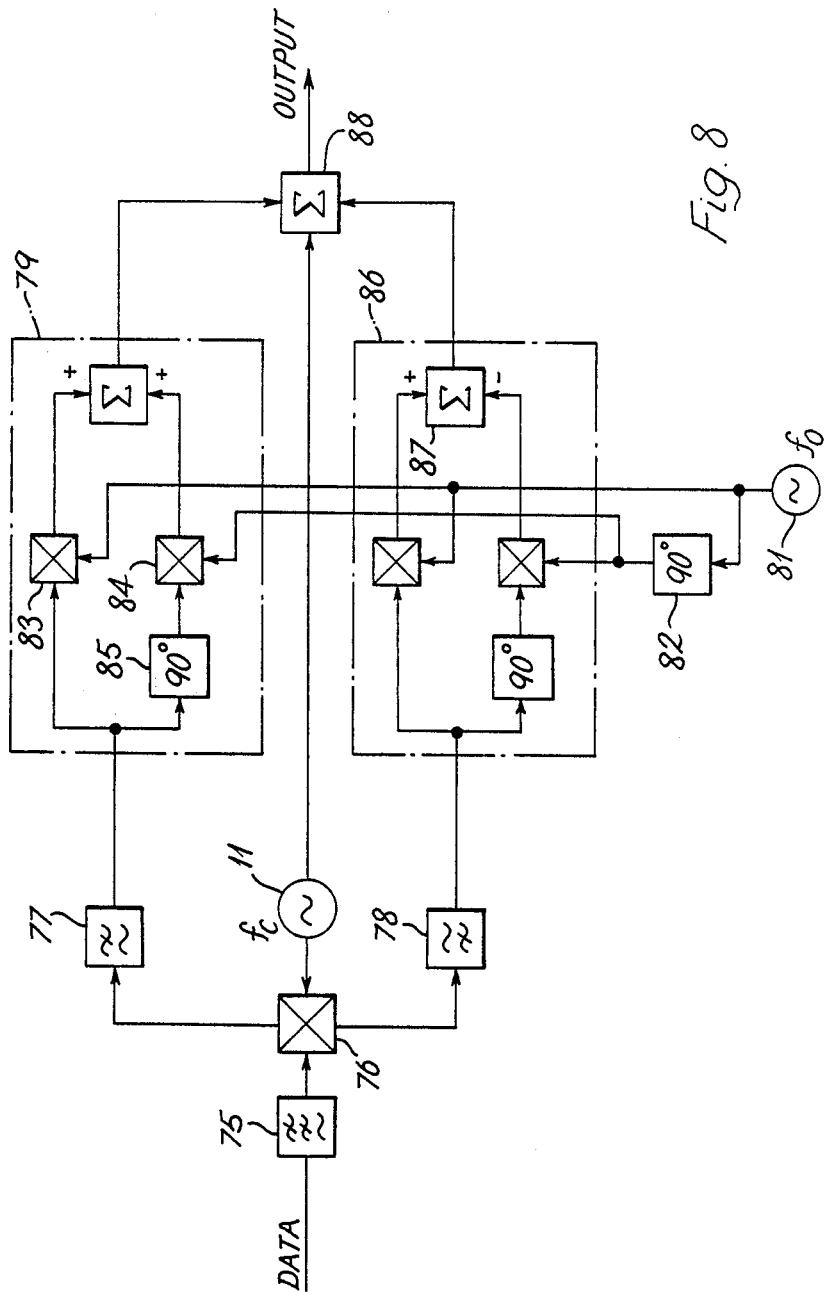

FIG. 1 is a block diagram of a TTIB transmitter used in an embodiment of the invention, FIG. 2a shows the frequency spectrum at the output of FIG. 1, FIG. 2b shows a frequency spectrum used in explaining the operation of FIG. 3, FIG. 3 is a block diagram of a receiver according to the invention employing feed forward control, FIG. 4 is a block diagram of a receiver according to the invention employing feedback control, FIG. 5 is a block diagram of a digital signal processor circuit which may be used to replace the transmitter of FIG. 1 or the receiver of FIG. 3 or 4, FIGS. 6 and 7 are flow charts for transmitter and receiver programs, respectively, and FIG. 8 is a block diagram of another TTIB transmitter used in an alternative embodiment of the invention.

In FIG. 1 binary data is applied to a mixer 10 which also receives a carrier signal $f_c$ from an oscillator 11. The binary data is usually received as rectangular pulses but it is shaped by passage through a low-pass filter (not shown) before reaching the mixer 10. Both sidebands from the mixer 10 covering, for example, a frequency spectrum from 600 Hz to 3.6 kHz pass through a low pass filter 12 before reaching a low pass filter 13 and a mixer 14. A lower portion of the spectrum, for example from 600 Hz to 1.8 kHz is selected by the filter 13 and applied to a combining circuit 15. The mixer 14 also receives a reference signal at a frequency $f_1$ and the lower portion of the lower sideband of the output signal from the mixer 14 is selected using a low pass filter 16. The output from the filter 16 corresponds to the upper portion of the band from the mixer 10 which is not passed by the filter 13 (in the example this output corresponds to that part of the original band extending from 1.8 kHz to 3.6 kHz). A further step in frequency translation now takes place in a mixer 17 which receives a reference signal $f_2$ which results in an output signal with two sidebands each corresponding to the upper portion of the spectrum from the mixer 10. This upper portion is combined with the lower portion in the summing circuit 15 and the upper sideband of the output from the mixer 17 is removed by a low pass filter 18. The resultant spectrum at the output from the filter 18 is shown in FIG. 2 and includes a lower portion 19, an upper portion 21 and a frequency "notch" 22 whose width is equal to $f_2 - f_1$. In the present example the notch is 600 Hz wide and therefore the upper portion 21 extends from 2.4 kHz to 4.2 kHz.

The carrier signal for the mixer 10 is also applied to a mixer 23 which receives a reference signal $f_3$ and the upper sideband of the signal from the mixer 23 is placed in the notch by choice of the frequency $f_3$. Preferably the upper sideband is placed at the centre of the notch by making $f_3$ equal to $(f_2 - f_1)/2$. The frequency $f_c$ and the lower sideband are removed by a high pass filter 24 before application to the combining circuit 15. The signal in the notch is designated 25 in FIG. 2. The process of generating a frequency notch as described above is similar to that described in British Specification No. 2161661 mentioned above.

The output signal from the circuit of FIG. 1 can now be applied to a single sideband (SSB) radio link with a pilot tone for the SSB system also inserted into the notch. Alternatively another radio or line link may be employed.

Before considering the receiver an alternative transmitter shown in FIG. 8 is described. Incoming data passes to a data shaping filter 75 (not shown in FIG. 1) and then to a mixer 76 which receives the carrier frequency $f_c$. Both side bands are passed to a low-pass filter 77 and a high-pass filter 78 (which may be mirror filters) so that the lower sideband appears at the output of the filter 77 and the upper sideband appears at the output of the filter 78. A frequency downconverter 79 receives the lower sideband and two reference signals of frequency $f_o$ in phase quadrature with one another from an oscillator 81 and a 90° phase shift circuit 82. The downconverter 79 comprises an "in phase" mixer 83 and a "quadrature" mixer 84, the latter receiving the lower sideband by way of a 90° phase shift circuit 85. When the outputs of the mirrors 83 and 84 are summed in a summing circuit the resulting new lower sidebands add and the new upper sidebands cancel. A frequency upconverter 86 operates in a similar way on the upper sideband signal from the filter 78 except, as indicated by the plus and minus signs adjacent to a summing circuit 87, the quadrature input is subtracted from the in phase input so that the upper sidebands add and the lower sidebands cancel. The outputs from the downconverter 79, the upconverter 86 and the oscillator 11 are added by a summing circuit 88 to give a signal similar to that shown in FIG. 2a except that the notch width is now $2f_o$ and the signal is at the carrier frequency $f_c$.

After transmission to remote location the conventional process of SSB demodulation or other demodulation takes place at the receiver and then the resulting spectrum which is nominally as shown in FIG. 2b is applied to a circuit shown in FIG. 3. The lower and upper portions, below and above the notch respectively, are separated by means of low and high pass filters 30 and 31 respectively and applied to mixers 32 and 33 (which may be mirror filters) where demodulation takes place. The outputs from the mixers 32 and 33 are combined in a combining circuit 34 whose output forms the data signal and passes by way of a low pass filter 35.

In order to obtain correct reference signals for demodulation in the mixers 32 and 33, the signal 25 in the notch requires frequency translation and phase correction to appropriate positions in the received spectrum. Assuming the original modulated carrier $f_c$ was the centre of the band where the frequency notch was introduced it must be restored to the position 37 shown in FIG. 2(b) and equally the demodulating signal for the upper portion must be positioned at the lower end of this portion as shown at 38 in FIG. 2(b). The signal 25 in the notch of the received spectrum is selected by a band pass filter 36 and applied to a mixer 40 which nominally shifts the frequency of the signal 25 up and down by the frequency $f_3$. The two resulting signals form the upper and lower sidebands of the output of the mixer 40 and are applied by way of a low pass filter 42 to the mixer 33 and by way of a high pass filter 43 to the mixer 32.

The required corrected value of $f_3$ is obtained as follows. For this embodiment of the invention to function the sides of the notch must not be perfect as shown but have a finite roll-off imparted by the filters 13 and 16 of FIG. 1. The upper and lower portions are applied to a mixer 44 and since signals in the two portions which correspond in that they originate from the same frequency in the spectrum before the notch was inserted (and are present by virtue of the above mentioned roll-off portions) are separated by the notch width, the lower sideband of the output of the mixer 44 is a signal whose frequency is equal to the notch width; that is $f_2 - f_1$ which equals $2f_3$ when the carrier signal is at the centre of the notch. This frequency is halved in a frequency divider 45 and applied as the reference signal to the mixer 40 so that any distortion in the notch due for example to frequency drift in the transmitter oscillators is automatically compensated.

A block diagram of an alternative circuit to FIG. 3 which uses feedback control is shown in FIG. 4. Filters 30, 31, 35 and 36, mixers 32 and 33 and the combining circuit 34 perform the same functions as in FIG. 4. However the control signals for correcting the demodulation signals applied to the mixers 32 and 33 are derived from signals at the output of these mixers, the output of the mixer 33 being applied directly to a mixer 50 and that from the mixer 32 being applied by way of a quadrature phase-shift circuit 51 to the mixer 50. The output of the mixer 50 is a magnitude signal which is used to vary the frequency and phase of an oscillator 52 which is nominally at $f_3$. As for FIG. 3 the mixers 32 and 33 require reference signals positioned as shown at 37 and 38 in FIG. 2(b) and these signals are obtained as lower and upper sidebands of the output from a mixer 53, the appropriate sidebands being selected by a low pass filter 54 and a high pass filter 55, respectively. The outputs of the mixers 32 and 33 in FIG. 4 (and FIG. 3) should theoretically be identical since the upper and lower portions correspond to the upper and lower sidebands of the modulator 10, and each sideband contains all the information of the data input. The signals applied to the circuit 51 from the mixer 32 and to the mixer 50 from the mixer 33 are therefore nominally identical and any difference is derived by the mixer 50 and used to correct the frequency of the oscillator 52. The circuits 32, 33 and 50 to 54 can be regarded as forming a phase locked loop, and the phase-shift circuit 51 ensures that the error correction signal is zero when frequency and phase are correct.

Some of the data information will almost certainly be absent from the output of at least one of the demodulators 32 and 33 due to the roll-off of the various filters, and it is preferable to combine both outputs as shown using the combining circuit 35, although there may be some circumstances when the output of one demodulator only is sufficient.

The mixer 10 and 76 of FIGS. 1 and 8 may be replaced by a modem employing BPSK or QPSK, the carrier signal then being generated within the modem. If a more complicated modulation system than BPSK is used, for example QPSK, then it is necessary to demodulate both upper and lower sidebands and use a combining circuit to derive the data output. Where more complicated modulation takes place in the transmitter, the demodulation in the receiver must, of course, correspond. At least one demodulation signal of appropriate frequency and phase is derived and correction of frequency and phase, which is dependent on a signal present in the upper and lower portions is required for a low error data output.

The circuits shown above can be put into operation using discrete filters and mixers, either analogue or digital and other discrete component circuits or they can be wholly or partially formed by programming the digital signal processor integrated circuits mentioned above or similar processors. It is well known that digital filters are implemented by successive multiplication and addition operations and the processors mentioned are specially adapted to carry out such multiplications at high speed. The various mixers shown are also ideal for implementation as multiplication processes in a programmed signal processor.

An example of a microprocessor circuit which can be used to replace the transmitter of FIG. 1 or the receiver of FIGS. 3 or 4 is shown in FIG. 5. Analogue signals are applied to a terminal 60 and then pass by way of an amplifier 61 and an antialiasing filter 62 to an analogue-to-digital converter (A/D) 63. A digital signal processor (DSP) 64 (that is a specialised microprocessor) such as the Texas TMS 320-10 or 320-20 receives the output from the A/D 63 and provides output digital samples to a digital-to-analogue converter (D/A) 65. A read-only memory 66 contains the program for the DSP and a random-access memory 67 for use during the operation of the program is also connected to the DSP. Analogue signals from the D/A 65 pass through an antialiasing filter 68 and an amplifier 69 to an output terminal 70.

An example of a program for the DSP 64 when used to replace the transmitter of FIG. 1 is given in the form of the flow chart of FIG. 6. Since this flow chart is analogous to FIG. 1 it will not be described except to point out that the various low pass filtering subroutines may or may not be the same but where they are the same their frequency characteristics depend on the parameters supplied to the subroutine so that the required different characteristics are obtained. The flow chart of FIG. 7 is an example of a program for the use of the DSP 64 as the receiver of FIG. 3.

Although some ways of putting the invention into effect have been specifically described it will be clear that there are many ways of doing so. For example the notch may be so positioned that no frequency translation of the carrier signal $f_c$ is required in the transmitter. Also the above mentioned British Patent Application and the corresponding United States Application No. 617733 show other methods of providing and employing TTIB as do British Patent Applications Nos. 8520580 (U.S. Pat. No. 4,679,243), 8519545 (U.S. Application No. 798,801) and 8430319 (U.S. Application No. 890,335), and many of these methods may be used with the present invention, in particular shifting both upper and lower portions of the spectrum in forming the notch.

Two forms of receiver locking system have been specifically described but others may be used, for example receivers in which the reference signal for one of the demodulators 32 and 33 only is corrected.

We claim:

1. A receiver for a communication system which employs a transmitter and a receiver, the transmitter comprising:
modulation means for modulating a carrier signal with an information signal in a baseband to derive a modulated signal,
frequency selection and translation means for dividing a frequency band including said modulated signal into upper and lower portions and for frequency translating one of said portions to produce an output signal of the frequency selection and translation means having at least said one portion which is translated in frequency to provide a notch between the lower and upper portions, and
means for transmitting the upper and lower portions of said carrier signal using a transmission signal, and the receiver comprising:
means for receiving the transmission signal and providing said upper and lower portions from the transmission signal,
means for demodulating at least one of said upper and lower portions to said baseband using a first demodulation signal,
correcting means for deriving a correcting signal dependent on a difference in frequency and phase in the lower and upper portions on reception but as referred to the original spectrum of the information signal, and
generating means, coupled to receive said correcting signal, for generating said first demodulation signal from the said carrier signal from said transmitter using said correcting signal.

2. A communication system including a transmitter and a receiver, the transmitter comprising:
modulator means for modulating a carrier signal with an information signal in a baseband to derive a modulated carrier signal,
frequency selection and filtering means for dividing the upper and lower portions and for carrying out frequency translation, the output signal of the frequency selection and translation means having at least one said portion which is translated in frequency to provide a notch between the lower and upper portions, and
means for transmitting the upper and lower portions and the carrier signal using a transmission signal, and the receiver comprising:
means for receiving the transmission signal and providing said upper and lower portions from said transmission signal;
means for demodulating the upper and lower portions using first and second demodulation signals, respectively,
means for deriving a correction signal dependent on a difference in frequency and phase in the lower and upper portions on reception but as referred to the original spectrum of the information signal, and
generating means for generating said first and second demodulation signals from said carrier signal from said transmitter, the generating means being coupled to receive the correcting signal and to employ the correcting signal in generating at least one of the first and second demodulation signals.

3. A communication system according to claim 2 wherein the transmitter modulation means comprises means for mixing the information signal and the carrier signal.

4. A communication system according to claim 2 wherein the transmitter modulation means comprises a modem employing one of the following techniques: binary phase-shift keying and quadrature phase-shift keying.

5. A receiver according to claim 1 wherein the generating means is also for generating in addition to the said first demodulation signal, a second demodulation signal from said carrier signal using the said correcting signal, and wherein the means for demodulating is also for demodulating the upper and lower portions using the said first and second demodulation signals, respectively.

6. A receiver according to claim 1 for a communication system in which the transmitter includes means for inserting the carrier signal into the notch, the receiver including means for extracting the carrier signal from the notch, on reception.

7. A receiver according to claim 1, wherein the upper and lower portions each contain at least one signal which originated from the same frequency in the spectrum before the notch was inserted and the correcting means is arranged to receive, as input signals, at least parts of the upper and lower portions containing the said one signal.

8. A receiver according to claim 7 wherein the correcting means comprises first receiver mixer means arranged to receive the said input signals and to derive a notch width signal having a frequency equal to the notch width, and means for deriving the said correcting signal from the notch width signal.

9. A receiver according to claim 8 for a communication system, wherein the generating means is also for generating, in addition to the said first demodulation signal, a second demodulation signal using said correcting signal, the generating means comprises a second receiver mixer means for receiving and mixing the carrier signal and the correcting signal and for generating the first and second demodulation signals as upper and lower sidebands resulting from said mixing, and the receiver also includes means for extracting the carrier signal, and third and fourth mixer means arranged to receive the first and second demodulation signals, and to demodulate the upper and lower portions, respectively.

10. A receiver according to claim 1, wherein the correcting means is arranged to receive, as input signals, demodulated output signals from the demodulation means, these output signals being dependent on any difference in frequency and phase in the upper and lower portions.

11. A receiver according to claim 10 for a communication system wherein the receiver comprises means for extracting the carrier signal, the correcting means comprises first receiver mixer means for deriving the correcting signal, and the generating means is arranged to generate, in addition to the said first demodulation signal, a second demodulation signal, and comprises a local generator for generating a reference signal having a frequency controlled by the correcting signal, and second receiver mixer means arranged to receive the carrier signal and the said reference signal and to generate the first and second demodulation signals.

12. A receiver according to claim 11 wherein the demodulation means comprises third and fourth receiver mixer means and the first receiver mixer means is arranged to receive the output signals of the third and fourth receiver mixer means as input signals.

13. A receiver according to any of claim 1 wherein at least some of the said means are formed by a programmed computer.

14. A communication system according to claim 2, wherein at least some of the said means of the transmitter and/or the receiver are formed by a programmed computer.

15. A receiver method for processing signals received in a communication system which employs a transmission method comprising modulating an information signal with a carrier signal in a baseband to derive a modulated signal, dividing a frequency spectrum including the modulated signal into lower and upper portions with a frequency notch between the lower and upper portions, and transmitting the upper and lower portions and the carrier signal using a transmission signal, the receiver method comprising:
  receiving the transmission signal and providing said upper and lower portions from said transmission signal,
  demodulating the upper and lower portions using first and second demodulation signals respectively,
  combining the demodulated upper and lower portions to form an output signal,
  deriving a correcting signal dependent on any difference in frequency and phase in the lower and upper portions on reception but as referred to the original spectrum of the information signal, and
  generating the first and second demodulation signals from the carrier signal used in the transmission method and employing the correcting signal in generating at least one of the first and second demodulation signals.

* * * * *